US008595112B2

(12) United States Patent
Silitch et al.

(10) Patent No.: US 8,595,112 B2
(45) Date of Patent: Nov. 26, 2013

(54) SYSTEMS AND METHODS FOR PROVIDING FINANCIAL SERVICES

(75) Inventors: Nicolas Silitch, New York, NY (US); Christopher Halldorson, Jersey City, NJ (US); Chaolun Harry Jin, West Winsor, NJ (US)

(73) Assignee: The Bank of New York Mellon Corporation, New York, NY (US)

( * ) Notice: Subject to any disclaimer, the term of this patent is extended or adjusted under 35 U.S.C. 154(b) by 547 days.

(21) Appl. No.: 11/740,663

(22) Filed: Apr. 26, 2007

(65) Prior Publication Data

US 2008/0228661 A1    Sep. 18, 2008

Related U.S. Application Data

(60) Provisional application No. 60/894,361, filed on Mar. 12, 2007.

(51) Int. Cl.
*G06Q 40/00* (2012.01)
(52) U.S. Cl.
USPC ....................................... 705/36 R

(58) Field of Classification Search
USPC .............................. 705/35, 36, 37, 38, 39, 40
See application file for complete search history.

(56) References Cited

U.S. PATENT DOCUMENTS

| 4,674,044 | A  | * | 6/1987 | Kalmus et al. | 705/37 |
| 6,353,812 | B2 | * | 3/2002 | Frankel et al. | 705/44 |
| 6,615,188 | B1 | * | 9/2003 | Breen et al. | 705/37 |
| 2003/0023498 | A1 | * | 1/2003 | Benton | 705/26 |
| 2006/0282370 | A1 | * | 12/2006 | Frankel et al. | 705/37 |

* cited by examiner

*Primary Examiner* — Rajesh Khattar
(74) *Attorney, Agent, or Firm* — Pillsbury Winthrop Shaw Pittman LLP (57) ABSTRACT

A new method and system for providing financial services is provided. These methods and systems can include providing banking and investment services to hedge fund money managers and other customers without the assistance or need for a prime broker. While employing the present invention a money manager may receive prime brokerage services from a bank or other financial service while at the same time be able to pursue investment opportunities with this bank or financial institution and other banks, institutions, and brokerages. The prime brokerage services that a money manger may receive can include accounting services, loan services, and cash management.

9 Claims, 5 Drawing Sheets

SYSTEMS AND METHODS FOR PROVIDING FINANCIAL SERVICES

CROSS REFERENCE TO RELATED APPLICATIONS

The present application claims the benefit of priority of provisional application Ser. No. 60/894,361, filed Mar. 12, 2007, and is hereby incorporated in its entirety by reference.

FIELD OF THE INVENTION

The present invention generally relates to financial services. More specifically the present invention relates to systems and methods for providing banking or investment brokerage services to money managers and other customers.

BACKGROUND

A fundamental service offered by a financial institution is to act as a repository for a customer's investments and to account for the distribution and growth of those investments. The financial services offered by a prime broker to a hedge fund are an example of such services. As is often the case in this relationship, a prime broker provides and services a single or main account in which a hedge fund may maintain all of its cash and securities. By providing these services to a hedge fund money manager, the prime broker can allow the money manager to focus on the investments in the hedge fund rather than attending to accounting or banking details necessary to operate the fund. A prime broker may also offer other services to the hedge fund. These can include cash management, reporting, and money lending.

In theory, a money manager of a hedge fund will be able to trade with several brokerage houses while maintaining a single account at the prime broker. By relying on these banking services from a single prime broker, a money manager may be freed to work with several brokerage houses rather than having to rely on a single brokerage house to provide all of these services. An advantage of maintaining relationships with several brokerage houses is that the money manager may learn about business opportunities, including IPOs, from several sources.

The origins of a prime brokerage account are commonly thought to date back to the late 1970's. Over the years the products offered by these prime brokers have changed, from a largely equity based product to more diverse services. These may include fixed income and derivative offerings, and foreign exchange and futures products. In each instance, these prime brokers have been separate entities apart from the brokerage houses and apart from the hedge funds that the money managers work for.

Today, prime brokers offer services in a competitive industry with high demands from the hedge fund industry. These prime brokers may generate revenues from commissions and fees on transactions, from spreads on loans, and by sophisticated financing products such as swaps and CFDs (Contracts for Difference). In some situations the prime broker may be exposed to loss if collateral held to secure loans falls below the value of the loan and the loan defaults. There are other risks as well.

Although commercial banks may make available to their clients a variety of discrete services that overlap with some of the specific services provided to hedge funds by prime brokers, as a general matter they have not sought to provide such clients with an integrated set of services replicating all of the services normally provided to a hedge fund by a prime broker.

BRIEF SUMMARY OF THE INVENTION

The present invention regards methods and systems for providing all of the services traditionally provided by "prime brokers" to hedge funds, investment companies and other institutional brokerage customers. This may be done in a manner that is more direct and transparent, and can result in lower costs and reduced operating risks to the customers and the institutions offering these services. This may also be done such that the intraday liquidity necessary to provide these products is provided without the need to reflect these transactions on the balance sheet of a financial institution practicing an embodiment of the invention.

In one embodiment, investment funds and other qualified institutional customers that utilize both long and short securities positions in their investment strategies ("Long/Short Investment Vehicles") may be able to create short positions needed for these vehicles by borrowing directly from securities lenders with a bank acting as an agent. This may be done instead of interposing an additional step of having the customer enter into a securities borrowing transaction with a prime broker acting as principal. By eliminating the prime broker, the cost of borrowing securities to cover short positions may be reduced substantially. Embodiments of the present invention may also include systems and methods that fund long positions in securities by providing direct access to repurchase agreement markets through a bank acting as agent. In this embodiment as well the additional step of borrowing from a prime broker may be eliminated. In so doing a lower cost of funds may be offered to the customer. Methods and systems of the present invention may also enable agent banks to provide services to customers that include: securities execution services; custody services; consulting; and, administrative, accounting and performance reporting services.

By acting in an agency capacity when creating short positions and funding long positions for Long/Short Investment Vehicles, the agent bank is able to avoid incurring the regulatory capital charges that would apply if the bank, as in the case of a prime broker providing services to a hedge fund, were to extend credit to the investment vehicle or enter as principal into other transactions that would appear on the bank's balance sheet.

Numerous systems and methods may embody the present invention including those described in this application.

DETAILED DESCRIPTION

As explained in more general detail above, Long/Short Investment Vehicles that desire to sell short need to borrow the securities that are the subject of the short sale in a timely and cost-effective manner. Securities lending transactions are the usual method for short sellers to obtain securities for this purpose. Long/Short Investment Vehicles often rely on leverage and therefore need to borrow cash to finance the creation of their long positions. These investment vehicles also require other services relating to their securities portfolios and trades, including execution and settlement services for trades, securities custody services for securities and other assets in the investment portfolio, and administrative and other support services such as accounting, fund administration and performance reporting.

As also explained above, hedge funds and similar investment vehicles traditionally have obtained these services from "prime brokers," which hold in custody cash and securities in a centralized master account and act as principal to facilitate securities trades with other market participants. The services typically provided by a prime broker include securities lending to facilitate the creation of short positions, financing of long positions, clearance and settlement of securities transactions, securities custody, and administrative and other support services of the types described above. The services may also include execution services. In addition, some prime brokers, at the customer's election, may provide consulting and advisory services and risk-management advisory services. In providing securities lending and financing services, prime brokers typically act as principal, intermediating themselves between the hedge fund and the ultimate counterparty in the transaction (e.g., a securities lender or a repo investor). That results in a lack of transparency for the hedge fund regarding the transactions effected for its account, and it also results in higher fees to the fund and ultimately lower returns for the fund's investors. The intermediation of the prime broker as principal in securities lending and financing transactions also introduces an additional layer of operational risk for the customer.

Methods and systems of the present invention may be employed to provide financial services to Long/Short Investment Vehicles including "130/30" mutual funds, which are funds authorized to invest roughly 130% of their assets in long positions and to maintain approximately 30% of its assets in short positions. Systems and methods of the invention may also be used by other investors employing similar or different investment strategies.

The present invention may allow Long/Short Investment Vehicles to obtain the services traditionally provided by prime brokers, but in a more transparent and cost-effective manner and with reduced operational risk. Utilizing systems and methods of the present invention Long/Short Investment Vehicles may be able to create short positions and fund long positions in securities through transactions effected directly with counterparties such as securities dealers or other institutional investors with a bank acting as agent. This provides an alternative to reliance on a prime broker and its pricing structure. The methods and systems of the present invention may also be used by the Long/Short Investment Vehicles to obtain ancillary services traditionally provided by prime brokers, including execution and settlement services, securities custody services, and administrative and other support services such as accounting, fund administration and performance reporting.

The present invention may allow a commercial bank to replicate the essential services provided by prime brokers for their clients while also avoiding the incurrence of most regulatory capital charges that would apply if a bank were to loan funds directly to a Long/Short Investment Vehicle or enter into other transactions as principal. Such principal transactions, to the extent that they create or are convertible into assets on a bank's balance sheet, require a bank to maintain regulatory capital as a percentage of such assets in accordance with the risk-based capital adequacy rules to which commercial banks are subject. This benefit may be present in each of the various embodiments described herein as well as in other embodiments not specifically disclosed.

In acting as agent rather than as principal in providing services to the Long/Short Investment Vehicle, the agent bank structures and arranges transactions suiting the Investment Vehicle's needs, which the Investment Vehicle then enters into directly with a counterparty identified by the agent bank. These include securities lending transactions arranged by the agent bank in order to create short positions for the Long/Short Investment Vehicle, in which the Investment Vehicle borrows securities directly from a third party securities lender, with the agent bank extending intraday liquidity and issuing a letter of credit and an indemnity to certain parties in the transactions in order to allow for the transactions to proceed as direct borrowings of securities by the Investment Vehicle rather than as borrowings by the bank as principal. The agent bank also arranges securities repurchase transactions ("repos") in which the Long/Short Investment Vehicle sells securities directly to third party investors identified by the agent bank, subject to an obligation to repurchase at the termination date of the repo, as a means of funding the creation of long positions for the Investment Vehicle. This is in contrast to the method by which prime brokers fund long positions of their hedge fund clients, in which the prime broker itself enters into repo transactions as principal and then lends the funds raised to the hedge fund client.

Figure 1:
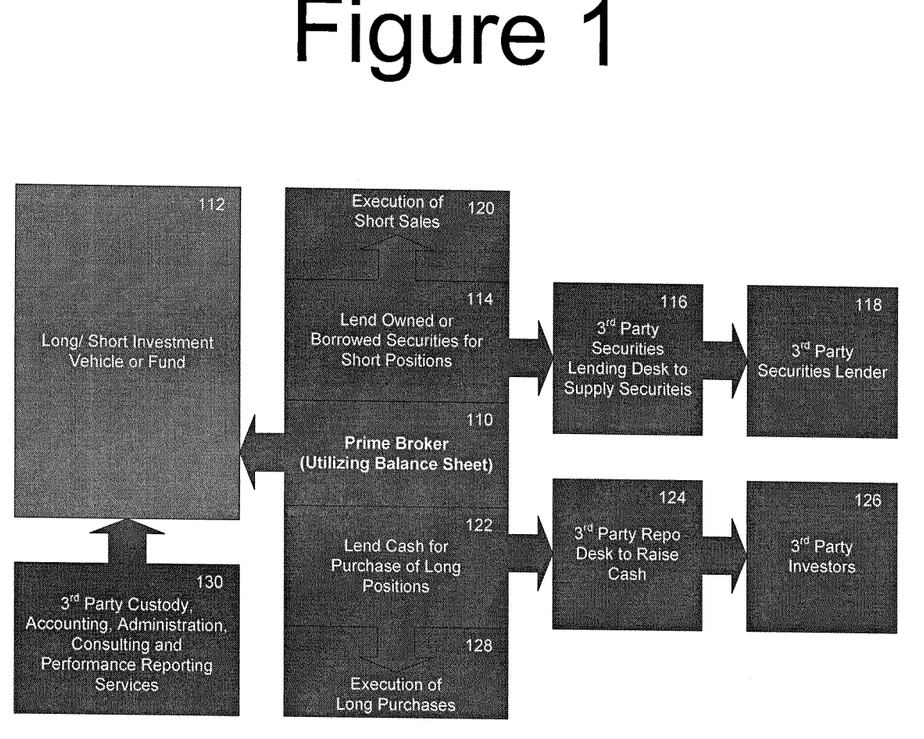
FIG. 1 illustrates a relationship between a prime broker and a Long/Short Investment Vehicle.

FIG. 1 illustrates a relationship between a prime broker 110 and a Long/Short Investment Vehicle 112 as described above. The prime broker 110, which is typically an investment bank or other securities broker-dealer, acts as principal (i.e., "utilizing balance sheet") in transactions with the Long/Short Investment Vehicle 112.

As shown at 114, short positions may be created for the Long/Short Investment Vehicle by the prime broker lending to the Vehicle securities that the prime broker owns or that it has borrowed from a third party securities lender. In the latter case, as shown at 116 and 118, the third-party securities lender from which the prime broker obtains the securities is typically acting as agent in lending securities owned by its customer, the security holder. The Long/Short Investment Vehicle then utilizes the securities execution services of the prime broker or another broker to execute short sales of the securities. This is shown at 120.

As shown at 122, the prime broker may also lend cash to the Long/Short Investment Vehicle to finance the purchase of long positions in securities. In order to raise funds to be on-lent to the Long/Short Investment Vehicle, the prime broker may enter into repos with one or more third-party investors, as shown at 124 and 126, in which the prime broker sells securities to an investor for cash and the prime broker agrees to repay the purchase price, plus interest, in exchange for the return to or repurchase from the investor of the same securities. The funds raised by the sale of those securities are then lent by the prime broker to the Long/Short Investment Vehicle, which utilizes them to finance the purchase of securities for its investment portfolio as shown at 128. The Long/Short Investment Vehicle then utilizes the securities execution services of the prime broker or another broker to affect those securities purchases.

As shown at 130, the prime broker may also arrange for third-party servicers to provide the Long/Short Investment Vehicle with securities custody, accounting, fund administration, consulting and performance reporting services.

There is a lack of transparency in these traditional prime broker arrangements, with the prime broker acting as intermediary between the Long/Short Investment Vehicle and the third party securities lenders (in the case of the creation of short positions) or the third-party repo investors (in the case of the financing of long positions). This lack of transparency, along with the intermediation of the prime broker as principal, may result in higher fees to the Long/Short Investment Vehicle in the creation of short positions and the funding of long positions. The interpositioning of the prime broker as principal may also increase operational risk for the Long/Short Investment Vehicle, as the addition of the prime broker as a party to the transactions adds another possible source of operational problems or delays.

Figure 2:
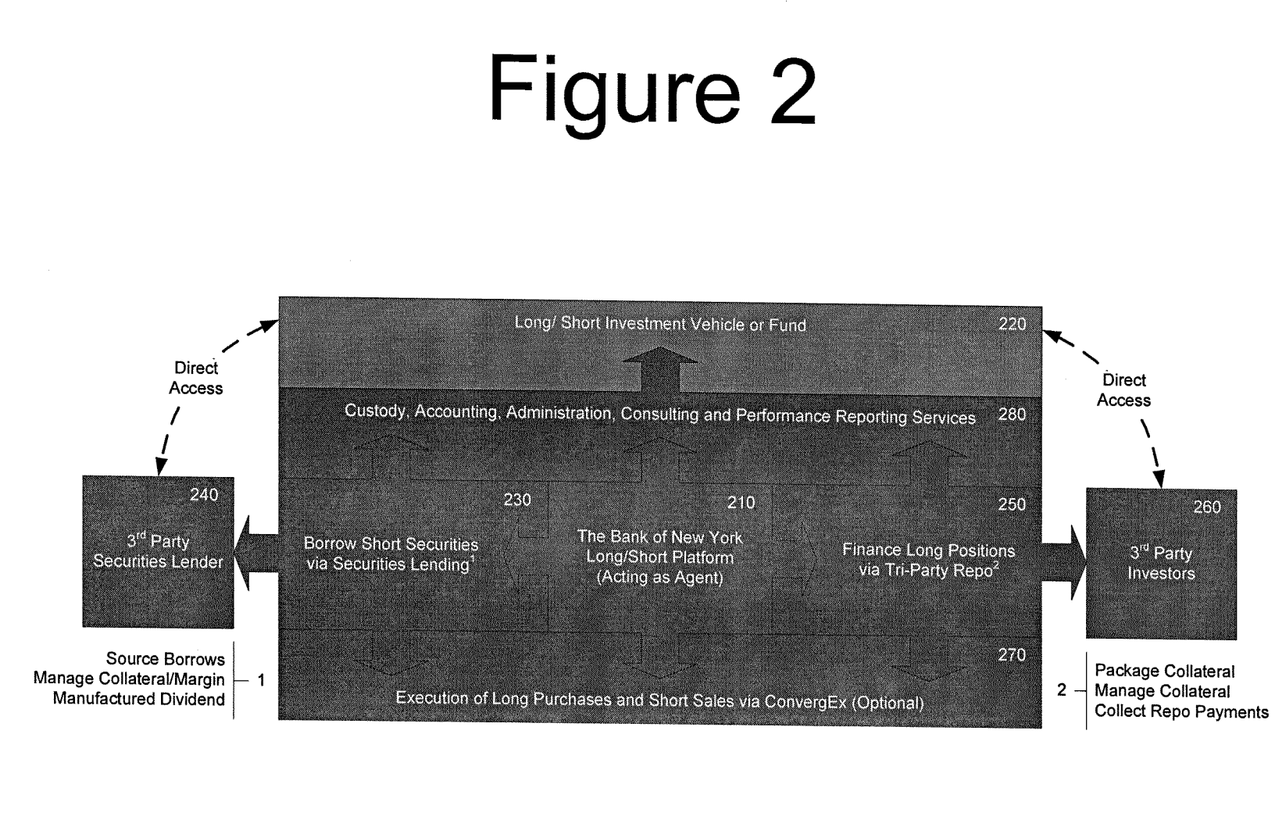
FIG. 2 illustrates steps that may be employed in systems and methods of the present invention.

FIG. 2 illustrates steps that may be employed in systems and methods of the present invention. Here, a bank 210, may facilitate the borrowing by a customer, in this case a Long/Short Investment Vehicle, of securities for short sales through securities lending. The bank 210 may further finance the Vehicle's long positions through repo transactions. In each case, systems and methods may be employed that allow the bank 210 to act as an agent rather than require a third-party prime broker to act in the capacity of a principal.

As shown in FIG. 2, short positions may be created for the Long/Short Investment Vehicle 220 through direct borrowings by the Vehicle 220 from the third-party securities lender 240 in transactions arranged by bank 210 and in which the bank 210 may indemnify the securities lender against risk of loss due to any failure by the Vehicle 220 to return the borrowed securities. In contrast to the manner in which prime brokers create short positions for hedge fund clients, the facilitation by the present invention of direct securities borrowings by the Long/Short Investment Vehicle 220 from the third-party securities lender may allow for greater transparency, the elimination or reduction of hidden costs and fees and improved operational efficiency. Those transactions and the role of the agent bank in them are discussed in more detail below in connection with FIG. 3.

The Long/Short Investment Vehicle's 220 long positions may be financed by tri-party repo transactions entered into by the Vehicle directly with one or more investors. A tri-party repo differs from a bilateral repo transaction by having as a third party to the governing agreement a custodian bank that acts as agent to both parties, safeguards the security before the investor's repurchase and agrees to protect the interests of one party in the event of default by the other. A bank agent 210 in accord with the present invention may arrange these tri-party repos and provides related services. As in the case of the creation of short positions, the facilitation by the invention of direct access by Long/Short Investment Vehicles to repo markets allows long positions to be financed in a more transparent, cost-effective and operationally efficient manner. These transactions and the role of the agent bank 210 practicing the present invention are discussed in more detail below in connection with FIG. 4.

The present invention may also allow for the provision by an agent bank to the Long/Short Investment Vehicle, at the Vehicle's option, of additional services of the types traditionally provided to hedge funds and similar investment vehicles by prime brokers. Long purchases 270 and short sales 270 of securities by the Long/Short Investment Vehicle can be executed by the agent bank or an affiliate of the agent bank. The Long/Short Investment Vehicle can also obtain securities custody, accounting, fund administration, consulting and performance reporting services from other units or affiliates of the agent bank, utilizing methods and systems of the present invention.

Figure 3:
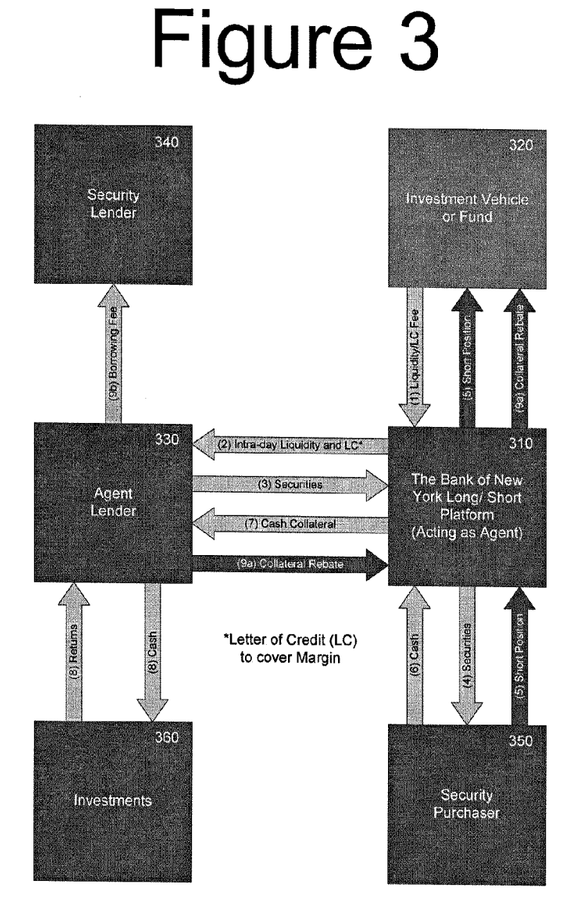
FIG. 3 illustrates steps that may be employed in systems and methods of the present invention for creating short positions for a Long/Short Investment Vehicle.

FIG. 3 illustrates transactions and steps that may be used in systems and methods of the present invention to create short positions for a Long/Short Investment Vehicle. Here, a Long/Short Investment Vehicle 320 may pay liquidity, letter of credit and Platform fees to an agent bank 310. The agent bank 310 may then extend funds on an intraday basis (intraday liquidity) to, and issues a letter of credit (to cover the margin for the securities to be lent to create the short position) for the benefit of, the agent lender 330. The agent lender 330 may be another bank or broker-dealer acting as an agent for its customer, which is the "securities lender" 340 (i.e., the owner of the securities 360 to be lent). The agent lender 330 may then provide the securities 360 while the agent bank 360 may indemnify the securities lender 340 against the risk of loss resulting from any failure by the Long/Short Investment Vehicle 320 to return the securities 360.

The securities 360 may then be delivered to the Long/Short Investment Vehicle's custodian, which can be the bank agent 310 or another bank or broker-dealer. The securities 360 may then be sold to another market participant 350, either by an affiliate of the agent bank 310 or a third-party broker-dealer. This may create a short position in the securities 360 for the Long/Short Investment Vehicle 320.

The cash generated by the sale of the securities 360 may then transferred to the agent lender as collateral for the securities lending transaction. Under the governing agreement for the securities lending transaction, the agent lender 330 may then be responsible for investing the cash collateral in the manner specified by the agreement.

At the expiration of the securities lending transaction, the agent lender 330 may disburse the bulk of the return on the investment of the cash collateral to the securities lender in the form of a borrowing fee. It may also rebate the cash collateral, together with a portion of the return on the investment of the cash collateral, for the Long/Short Investment Vehicle. Credits may then be made to the custody account of the Long/Short Investment Vehicle, either at the agent bank (where the agent bank 310 is serving as the securities custodian for the Vehicle) or another bank or broker-dealer. The agent lender 330 is also compensated for its services in the securities lending transaction by a securities lending fee paid from the return on the investment of the cash collateral.

Figure 4:
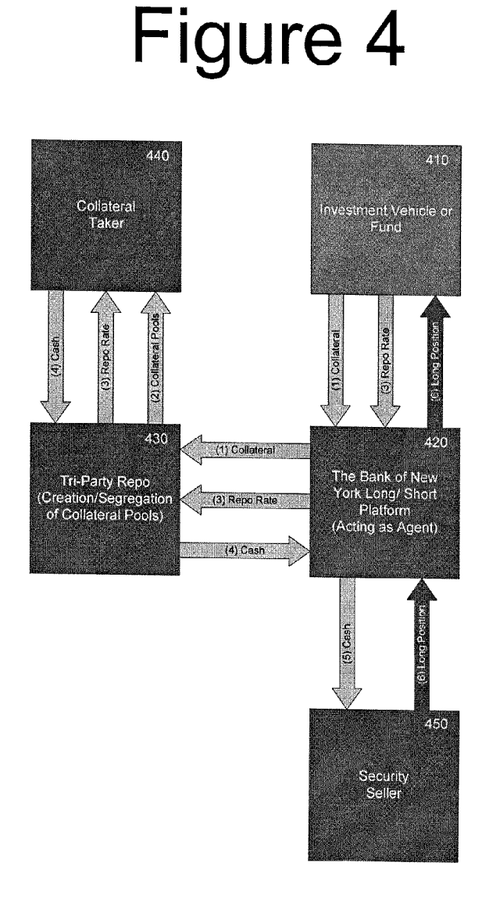
FIG. 4 illustrates steps that may be employed in systems and methods of the present invention for creating long positions for a Long/Short Investment Vehicle.

FIG. 4 illustrates the steps that may be involved by the invention to finance long positions for Long/Short Investment Vehicles 410 in accord with the invention. As an initial step, the Long/Short Investment Vehicle 410 may provide collateral, typically in the form of U.S. Treasury securities or similar securities, to the bank agent 420. The collateral may then be transferred by the bank agent to the Tri-Party Repo system 430. This system 430 may administer repo transactions for major market participants and other institutional investors. The Tri-Party Repo system 430 would create and segregate pools of collateral for sale to market participants. The participants would act as purchasers in the repo transactions ("collateral takers").

The Tri-Party Repo system 430 would sell the collateral pools to one or more collateral takers 440 in accord with the invention. In accord with the invention, Long/Short Investment Vehicles would be obligated to repurchase the collateral on the termination date for the repo at the same price at which the collateral was sold and to pay interest for the use of funds at an agreed-upon rate (the "repo rate"). The purchase price for the collateral pools sold to the collateral takers would be returned by the Tri-Party Repo system to the agent bank 420.

If the agent bank is serving as the securities custodian for the Long/Short Investment Vehicle, the funds may be credited by the agent bank to the Vehicle's custody account, and the funds may then be used by the Long/Short Investment Vehicle to purchase long positions in securities from securities sellers. Those securities purchases may then be executed by an affiliate of the agent bank for the account of the Long/Short Investment Vehicle.

Figure 5:
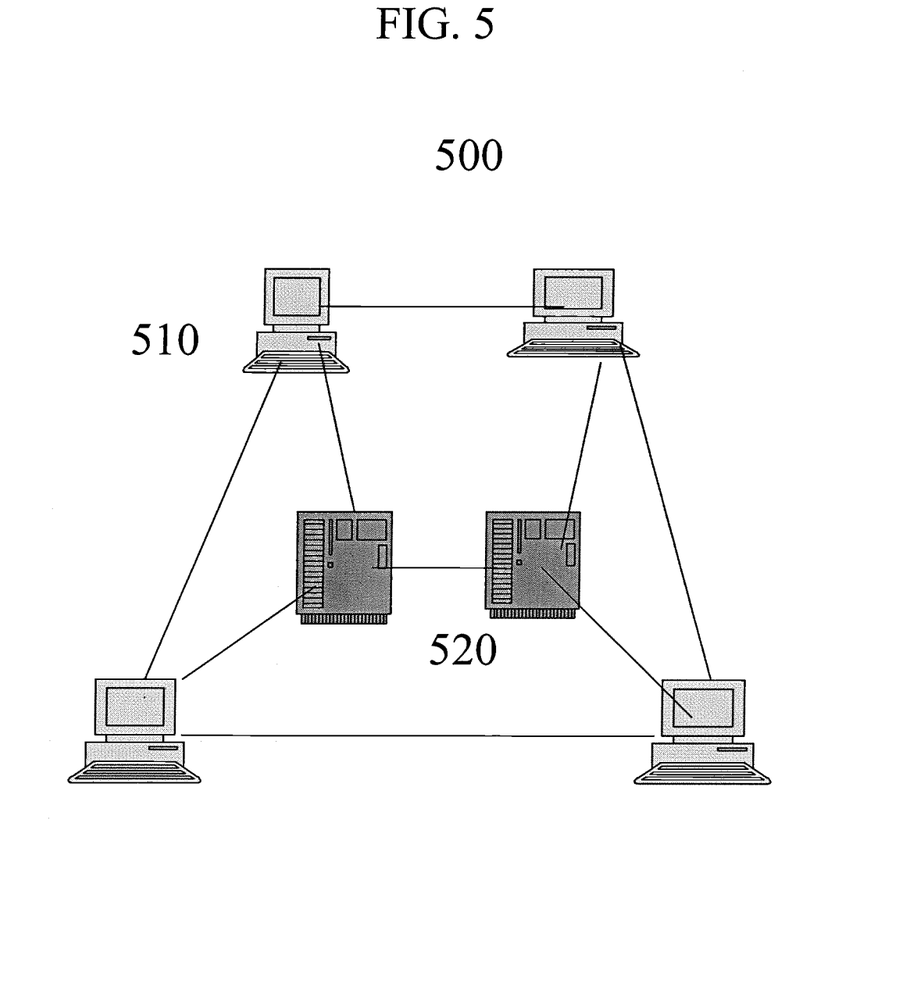
FIG. 5 illustrates a computing system that may be employed in accord with embodiments of the present invention.

If a bank other than the agent bank or a broker-dealer is serving as the Long/Short Investment Vehicle's securities custodian, then the funds received for the sale of the collateral pools may be delivered by the system carrying out this steps to the Vehicle's custodian for use in effecting the securities purchases. These may be executed through a third-party broker-dealer FIG. 5 is a computer network that may be employed in accord with embodiments of the present invention. This network may include two or more server 520 and numerous workstations 510 connected to each other over a network. The servers may each be associated with one of an agent bank, a vendor of investment securities, and an investment fund seeking to purchase the investment securities. The servers may be in communication with each other to generate and exchange instructions that may carry out and execute the methods described herein. These methods may be carried out in the same order as described herein and may be carried out in other orders as well. In embodiments of the invention the instructions to purchase may be generated at a workstation at the investment fund, processed through a server at an agent bank, and then be received at a server associated with the vendor. At each location, a review and approval of the transaction may be conducted at a workstation located at the applicable financial institution. For example, a workstation at the bank may require that transactions larger than preset limits be approved by an official having certain authority and that until the transaction is approved, the server at the bank will not request that the transaction be forwarded to a vendor of the security interest being requested.

Various embodiments of the invention may include hybrid trading systems in addition to a completely automated trading system. This hybrid system may include completely automated portions and portions that require manual intervention. For instance, a trading desk at a financial institution may act as an intermediary between electronic trading systems to complete financial transaction in accord with the current invention. The traders may, when practicing embodiments of the invention, make intraday entries to account for the liquidity necessary to satisfy the long and short transactions processed by the traders. It some embodiments, it is at this manual step that the bank would be acting as an agent to facilitate a short position or other financial vehicle in order to satisfy the request of a customer.

Various embodiments of the present invention are provide herein. Other embodiments in addition to these are also possible. Moreover, the present invention may also be embodied by methods carrying out some or all of the steps provided herein in the described order as well as in other orders. Further these steps may include additional steps and only a portion of the described steps.

What is at least claimed is:

1. A computer-implemented method of providing financial services to an investor over a network without employing the services of a prime broker, the method comprising:
   receiving via the network, and in one or more computer processors at an agent bank, a received instruction from an investor, the received instruction being associated with an account of the investor and including a request to acquire a security interest in an identified investment vehicle from a vendor of the investment vehicle;
   processing, with the one or more computer processors at the agent bank, the received instruction from the investor;
   generating a generated instruction with the one or more computer processors at the agent bank, the generated instruction comprising a request that the vendor transfer the security interest in the identified investment vehicle to create a short position in the identified investment vehicle;
   sending, with the one or more computer processors at the agent bank, the generated instruction directly to the vendor of the identified investment vehicle via the network;
   providing, by the one or more computer processors at the agent bank, funds on an intraday liquidity basis electronically over the network to an agent lender acting on behalf of the vendor of the identified investment vehicle and issuing, by the agent bank, a Letter of Credit electronically over the network for the benefit of the agent lender without reflecting a short position on the balance sheet of the agent bank; and
   in response to the intraday liquidity provided and the Letter of Credit issued by the agent bank for the benefit of the agent lender, characterizing the transfer of the security interest in the identified investment vehicle as a direct borrowing of the security interest by the investor and not an acquisition or borrowing of the security interest by the agent bank;
   wherein the agent bank, acting in an agency capacity, avoids regulatory charges that would apply if the bank were to acquire the security interest in the identified investment vehicle as a principal.

2. A method of operating a computer network to provide financial services to a managed investment fund by an agent bank without employing the services of a prime broker, the method comprising:
   receiving via the network in a computer at an agent bank a received instruction from a managed investment fund, the received instruction being associated with a specific account of the fund and including a request to acquire a specific security interest in an investment vehicle from a vendor of the investment vehicle;
   generating, with the computer, a generated instruction at the agent bank comprising a request that the vendor of the investment vehicle create a short position in the specific security interest in the investment vehicle;
   sending, via the computer, the generated instruction directly to the vendor of the identified investment vehicle by the agent bank via the network;
   providing, via the computer and by the agent bank, funds on an intraday liquidity basis electronically over the network to an agent lender acting on behalf of the vendor of the investment vehicle and issuing, by the agent bank, a Letter of Credit electronically over the network for the benefit of the agent lender without reflecting a short position on the balance sheet of the agent bank;
   responsive to the intraday liquidity provided and the Letter of Credit issued by the agent bank for the benefit of the agent lender, characterizing the creation of the short position in the investment vehicle as a direct borrowing of the security interest by the investor and not an acquisition or borrowing of the security interest by the agent bank; and
   responsive to the agent lender acting in an agency capacity and providing the security interest to the managed fund, indemnifying, by the agent bank, the agent lender against risk of loss resulting from any failure of the managed investment fund to return the borrowed security interest in the investment vehicle;

wherein the agent bank, acting in an agency capacity, avoids regulatory charges that would apply if the bank were to extend credit or acquire the security interest in the identified investment vehicle as a principal.

3. A computer network executing a financial transaction between an agent bank acting in an agency capacity for a managed investment fund, the managed investment fund and a vendor of a security investment without use of a prime broker, the computer network comprising:

a server associated with the agent bank, the server associated with the agent bank being networked with a server associated with the managed investment fund and a server associated with an agent lender acting on behalf of the vendor of the security investment;

wherein the server associated with the agent bank comprises instructions stored in memory to receive from the server associated with the managed investment fund, a request to purchase an investment security debited to an account of the agent bank, and to generate instructions that are sent to the server associated with the agent lender that comprise a request to purchase the investment security from the vendor;

wherein the server associated with the agent lender receives the request to purchase from the server associated with the agent bank and records the sale of the investment and debits the account of the agent bank for the transaction;

wherein the investment security comprises one of a long investment position of a tradable investment and a short investment position of the tradable investment;

wherein the agent bank serves in the agency capacity for the managed investment fund when obtaining at least one of the long investment positions or the short investment positions in the tradable investment; and wherein the agent bank extends capital when obtaining at least one of the long investment positions or the short investment vehicles without making a concurring balance sheet entry that affects an amount of capital the agent bank must maintain as a percentage of assets; and wherein, by acting in an agency capacity, the agent bank thereby avoids regulatory capital charges that would apply in a case where services of the prime broker are conventionally used.

4. The computer network of claim 3, wherein the investment vehicle is a hedge fund.

5. The computer network of claim 3, further comprising the agent bank indemnifying the agent lender of the investment security associated with the short investment position.

6. The computer network of claim 3, wherein the agent bank, acting on behalf of the managed investment fund, purchases treasury notes at a first point in time for a purchase price and sells treasury notes at a later point in time at a sale price, the sale price being larger than the purchase price.

7. A system for providing financial services to an investment fund by an agent bank via a computer network without utilizing a prime broker, the system comprising:

one or more computer processors at an agent bank configured to:

receive, at the one or more computer processors, a first instruction from an investment fund via the computer network, the first instruction being associated with a specific account of the investment fund and including a request to acquire a specific security interest in an identified investment vehicle from a vendor of the investment vehicle;

generate, by the one or more computer processors, a second instruction in response to the first instruction, the second instruction comprising a request that the vendor of the investment vehicle create a short position in the account of the fund with respect to the specific security interest in the identified investment vehicle;

transmit, via the network, the second instruction directly to the vendor of the identified investment vehicle; and provide, by the one or more computer processors and electronically over the network, funds on an intraday liquidity basis from the agent bank to an agent lender acting on behalf of the vendor of the identified investment vehicle, and a letter of credit from the agent bank for the benefit of the agent lender, without reflecting a short position on the balance sheet of the agent bank;

wherein the short position is created, responsive to the intraday liquidity provided and the letter of credit issued by the agent bank for the benefit of the agent lender, as a direct borrowing of the security interest by the investment fund, and not an acquisition or borrowing of the security interest by the agent bank; and wherein the agent bank, acting in an agency capacity, avoids regulatory charges that would apply where the services of a prime broker were employed in the transactions.

8. The system of claim 7 wherein the agent bank, responsive to the agent lender acting in an agency capacity and providing the security interest to the managed fund, indemnifies the agent lender against risk of loss resulting from any failure of the by the managed investment fund to return the borrowed security interest in the investment vehicle.

9. The system of claim 7 wherein the investment fund is a managed hedge fund.

* * * * *